(12) United States Patent
Won et al.

(10) Patent No.: US 9,882,231 B2
(45) Date of Patent: Jan. 30, 2018

(54) SEALING TOOL FOR POUCH TYPE SECONDARY BATTERY

(71) Applicant: LG CHEM, LTD., Seoul (KR)

(72) Inventors: Jong Hyun Won, Daejeon (KR); Min Su Kim, Daejeon (KR); Gyo Ryun No, Daejeon (KR); Seul Ki Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 220 days.

(21) Appl. No.: 14/414,638

(22) PCT Filed: Jul. 28, 2014

(86) PCT No.: PCT/KR2014/006899
§ 371 (c)(1),
(2) Date: Jan. 13, 2015

(87) PCT Pub. No.: WO2015/030373
PCT Pub. Date: Mar. 5, 2015

(65) Prior Publication Data
US 2016/0049682 A1 Feb. 18, 2016

(30) Foreign Application Priority Data
Aug. 30, 2013 (KR) .................. 10-2013-0103631

(51) Int. Cl.
*H01M 10/04* (2006.01)
*H01M 10/058* (2010.01)
*H01M 2/02* (2006.01)

(52) U.S. Cl.
CPC ....... *H01M 10/0404* (2013.01); *H01M 2/021* (2013.01); *H01M 2/0275* (2013.01)

(58) Field of Classification Search
CPC . H01M 2/021; H01M 2/0275; H01M 10/0404
(Continued)

(56) References Cited

U.S. PATENT DOCUMENTS

| 7,858,217 B1 | 12/2010 | Goda et al. |
| 2003/0118685 A1* | 6/2003 | Takita ................ B29C 63/02 425/510 |

(Continued)

FOREIGN PATENT DOCUMENTS

| JP | 2001-202934 A | 7/2001 |
| JP | 2002-298799 A | 10/2002 |

(Continued)

OTHER PUBLICATIONS

Tsurumaki, F., Machine Translation of JP 2002-298799 A, Oct. 2002.*

(Continued)

*Primary Examiner* — Sean P Cullen
(74) *Attorney, Agent, or Firm* — Birch, Stewart, Kolasch & Birch, LLP

(57) ABSTRACT

The present invention relates to a sealing tool for a pouch type secondary battery, which seals a pouch provided with an electrode assembly therein, the sealing tool including: a holder elevatably disposed on each of upper and lower sides of the pouch; and a sealing block coupled to the holder to contact the pouch by the elevation of the holder, thereby sealing the pouch. The sealing block and the holder are spaced apart from each other to define a space therebetween. According to the present invention, a spacing member is interposed between the holder and the sealing block of the sealing tool to define a space into which the sealing block is deformable, thereby minimizing the deformation of a sealing surface of the sealing block. Thus, the sealing part of the pouch may have a uniform thickness to prevent an electrolyte within the pouch from leaking to the outside.

8 Claims, 7 Drawing Sheets

(58) Field of Classification Search
USPC .................................. 429/185; 156/443, 538
See application file for complete search history.

(56) References Cited

U.S. PATENT DOCUMENTS

| | | |
|---|---|---|
| 2003/0200722 A1 | 10/2003 | Liao |
| 2010/0255368 A1 | 10/2010 | Park et al. |
| 2011/0018206 A1 | 1/2011 | Beele |
| 2013/0189570 A1 | 7/2013 | Park et al. |
| 2013/0244095 A1 | 9/2013 | Min et al. |

FOREIGN PATENT DOCUMENTS

| | | |
|---|---|---|
| KR | 10-2009-0065587 A | 6/2009 |
| KR | 10-2011-0039011 A | 4/2011 |
| KR | 10-2012-0038695 A | 4/2012 |
| KR | 10-2012-0060708 A | 6/2012 |
| KR | 10-2013-0071813 A | 7/2013 |
| TW | 497289 B | 8/2002 |
| TW | I239115 B | 9/2005 |
| TW | I260806 B | 8/2006 |
| TW | I303895 B | 12/2008 |

OTHER PUBLICATIONS

"Feeler gauge—Wikipedia, the free encyclopedia" Nov. 3, 2014, XP055193768.

* cited by examiner

Prior Art

SEALING TOOL FOR POUCH TYPE SECONDARY BATTERY

FIELD OF THE INVENTION

The present invention relates to a sealing tool for a pouch type secondary battery, and more particularly, to a sealing tool for a pouch type secondary battery in which a spacing member is interposed between a holder and a sealing block of the sealing tool to define a space into which the sealing block is deformable, thereby minimizing the deformation of a sealing surface of the sealing block.

DISCUSSION OF RELATED ART

In general, with the development of portable electronic devices, such as cellular phones, notebook computers, and camcorders, studies on secondary batteries that are chargeable or dischargeable unlike primary batteries are being actively performed. Examples of the secondary batteries include nickel-cadmium batteries, nickel-metal hydride batteries, nickel-hydrogen batteries, and lithium ion batteries. Among these, such a lithium ion battery may be used for a power supply of a portable electronic device. Alternatively, a plurality of lithium ion batteries may be connected to each other in series so as to be used for a power supply of a high-powered hybrid vehicle. Here, the lithium secondary battery may have an operation voltage greater about three times than that of the nickel-cadmium battery or nickel-metal hydride battery and relatively superior energy density per unit weight. Thus, the lithium secondary battery is significantly increasing in use.

The lithium secondary battery may be manufactured in various forms. Examples of representative forms of the lithium secondary battery may include cylinder type lithium secondary batteries and prismatic type lithium secondary batteries. Lithium polymer batteries that are being spotlighted in recent years are manufactured into flexible pouch types. Such a pouch type lithium polymer battery (hereinafter, referred to as "a pouch type secondary battery") may be relatively free in shape.

FIG. 1 illustrates a general pouch type secondary battery 10 and a sealing tool 20 for sealing the pouch type secondary battery 10.

Referring to FIG. 1, a pouch type secondary battery 10 includes a pouch 11 and an electrode tap 12 configured to electrically connect the pouch 11. An electrolyte is injected into the pouch 11 in a state where the pouch is opened, and the electrode tap 12 extends from an electrode assembly (not shown) within the pouch 11 to protrude outward from the pouch 11. Also, a sealing part 13 is disposed along an edge of the pouch 11 to seal the pouch 11.

Here, a bonding surface of the sealing part 13 is coated with a pouch sealant (e.g., the pouch sealant may be a material that is capable of bonding at least two surfaces to each other and serves as a barrier or a protection coating), and a bonding surface of the electrode tap 12 is coated with a tap sealant.

As described above, the applied pouch and tap sealants are heated and melted by using the sealing tool 20 driven by elevation unit 30 to allow the sealing part 13 of the pouch 11 to seal the pouch 11.

The sealing tool 20 is disposed on each of upper and lower sides of the sealing part 13 of the pouch 11 and is elevated by an elevation unit to press the sealing part 13 of the pouch 11 through the elevation thereof. Here, a heating unit (not shown) that is built in the sealing tool 20 generates heat to heat the sealing part 13 of the pouch 11. That is, the sealing tool 20 heats and presses the sealing part 13 to seal the pouch 11, thereby sealing the pouch 11.

The technique for sealing the sealing part 13 of the pouch 11 by using the sealing tool 20 as described above is disclosed in detail in Korea Patent publication Nos. 2013-0071813, 2012-0038695, and 2011-0039011.

Since the sealing tool 20 is heated at a high temperature of 180° C. or more by the built-in heating unit, thermal deformation in which a sealing surface 21 protrudes outward may occur as illustrated in FIG. 2.

If the sealing surface 21 of the sealing tool 20 is deformed, the sealing part 13 of the pouch 11 may have a nonuniform sealing thickness. That is, a sealing portion 13-1 of the pouch 11 sealed by a central portion 21-1 protruding outward from the sealing surface 21 of the sealing tool 20 may sufficiently receive a pressure for sealing to realize proper sealing performance. However, a sealing portion 13-2 of the pouch 11 sealed by each of both side portions of the sealing tool 20 may insufficiently receive the pressure for sealing and thus may not realize the proper sealing performance to cause leakage of the electrolyte.

PRIOR ART DOCUMENTS (Patent Document 1) Korea Patent publication No. 2013-0071813

(Patent Document 2) Korea Patent publication No. 2012-0038695

(Patent Document 3) Korea Patent publication No. 2011-0039011

SUMMARY OF THE INVENTION

Technical Problem

Accordingly, the present invention aims at providing a sealing tool for a pouch type secondary battery in which a spacing member is interposed between a holder and a sealing block of the sealing tool to define a space into which the sealing block is deformable, thereby minimizing the deformation of a sealing surface of the sealing block.

Technical Solution

According to an aspect of the present invention, there is provided a sealing tool for a pouch type secondary battery, which seals a pouch provided with an electrode assembly therein, the sealing tool including: a holder elevatably disposed on each of upper and lower sides of the pouch; and a sealing block coupled to the holder to contact the pouch by the elevation of the holder, thereby sealing the pouch, wherein the sealing block and the holder are spaced apart from each other to define a space therebetween.

The sealing tool may further include a spacing member disposed in the space between the holder and the sealing block.

The spacing member may be provided as an elastic body having elasticity in a direction in which the holder is elevated.

The spacing member may be provided as a feeler gauge.

The spacing member may be provided in plurality, and the plurality of spacing members may be respectively disposed on both ends of the space.

The sealing tool may further include a heating coil built in the sealing block.

The electrode assembly may include one of: a jelly-roll type electrode assembly in which at least one anode, separator, and cathode are successively stacked and wound; a stack and folding type electrode assembly in which a unit cell comprising an anode, a separator, and a cathode, which are successively stacked, is disposed on a separator having a long film shape and is wound in a single direction; and a stack and folding type electrode assembly in which a unit cell comprising an anode, a separator, and a cathode, which are successively stacked, is disposed on a separator having a long film shape and is wound in a zigzag direction.

Also, there is provided a pouch type secondary battery manufactured by the sealing tool for the pouch type secondary battery described above.

Advantageous Effects

Therefore, the spacing member may be interposed between the holder and the sealing block of the sealing tool to define the space into which the sealing block is deformable, thereby minimizing the deformation of the sealing surface of the sealing bloc.

Also, the sealing part of the pouch may have uniform sealing thickness to prevent the electrolyte within the pouch from leaking to the outside.

DETAILED DESCRIPTION

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Accordingly, embodiments and structures illustrated herein are suggested only by way of example but do not represent all technical concepts of the present invention. Therefore, it will be understood that various equivalents and modifications may exist which can replace the embodiments described at the time of the application. Moreover, detailed descriptions related to well-known functions or configurations will be ruled out in order not to unnecessarily obscure subject matters of the present invention.

Figure 3:
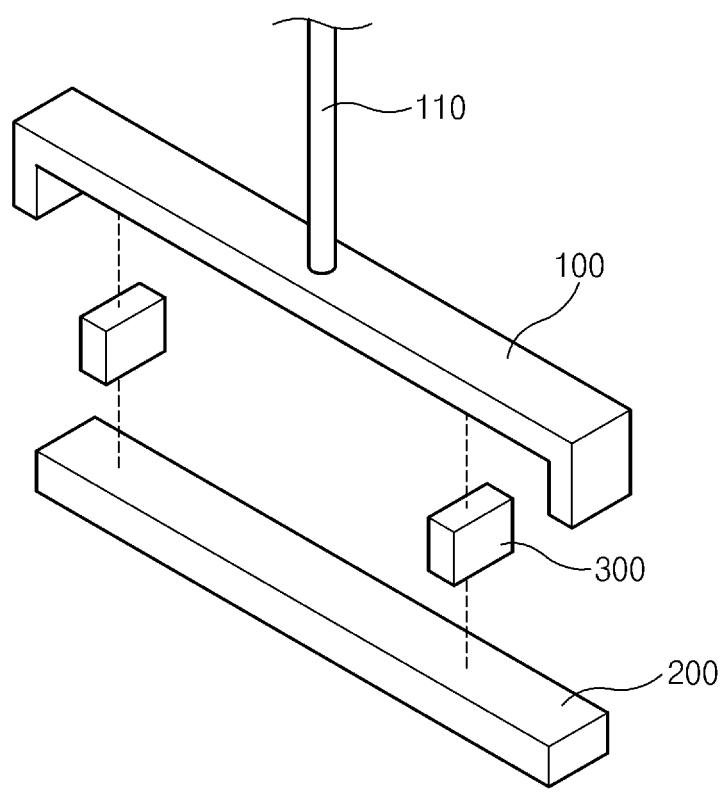
FIG. 3 is an exploded perspective view of a sealing tool for a pouch type secondary battery according to the present invention.
Figure 4:
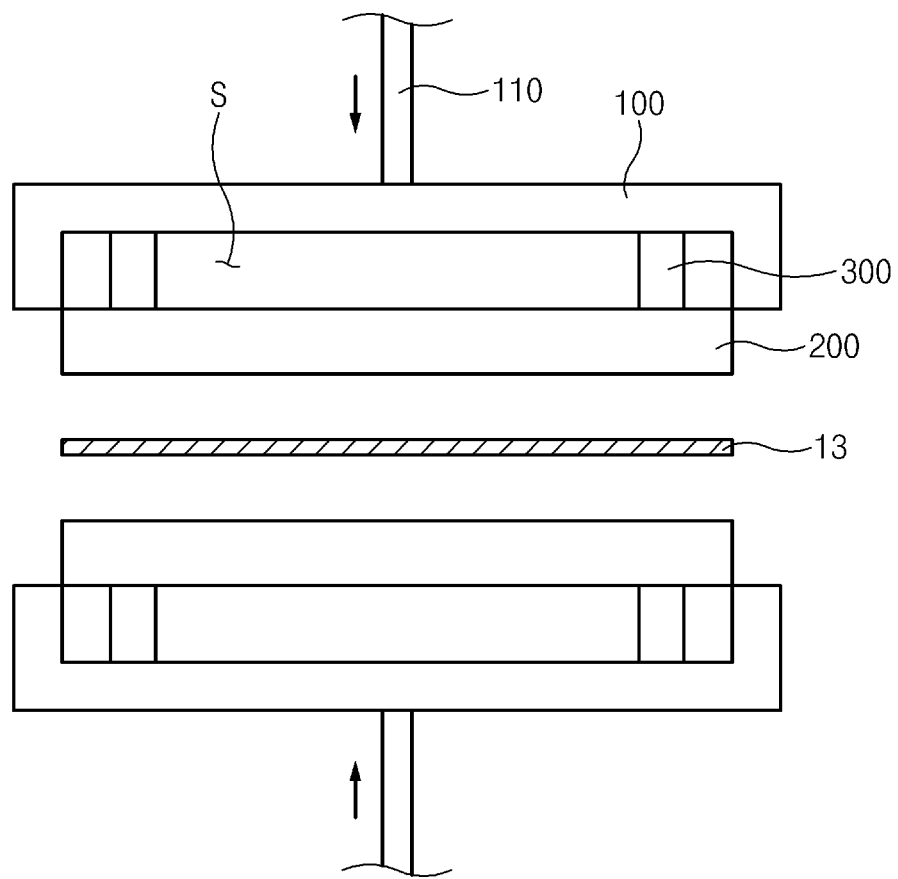
FIG. 4 is a side view of the sealing tool for the pouch type secondary battery according to the present invention.

Hereinafter, a sealing tool for a pouch type secondary battery according to an exemplary embodiment of the present invention will be described with reference to accompanying drawings FIG. 3 is an exploded perspective view of a sealing tool for a pouch type secondary battery according to the present invention, and FIG. 4 is a side view of the sealing tool for the pouch type secondary battery according to the present invention. The sealing tool is a pair of sealing jaws. Each jaw has a holder having a first surface and a sealing block having a second surface. The holder and sealing block are spaced apart from each other in a first direction to define a space there between. Spacing members extending between the holder and sealing block are spaced apart from each other in a second direction.

Figure 1:
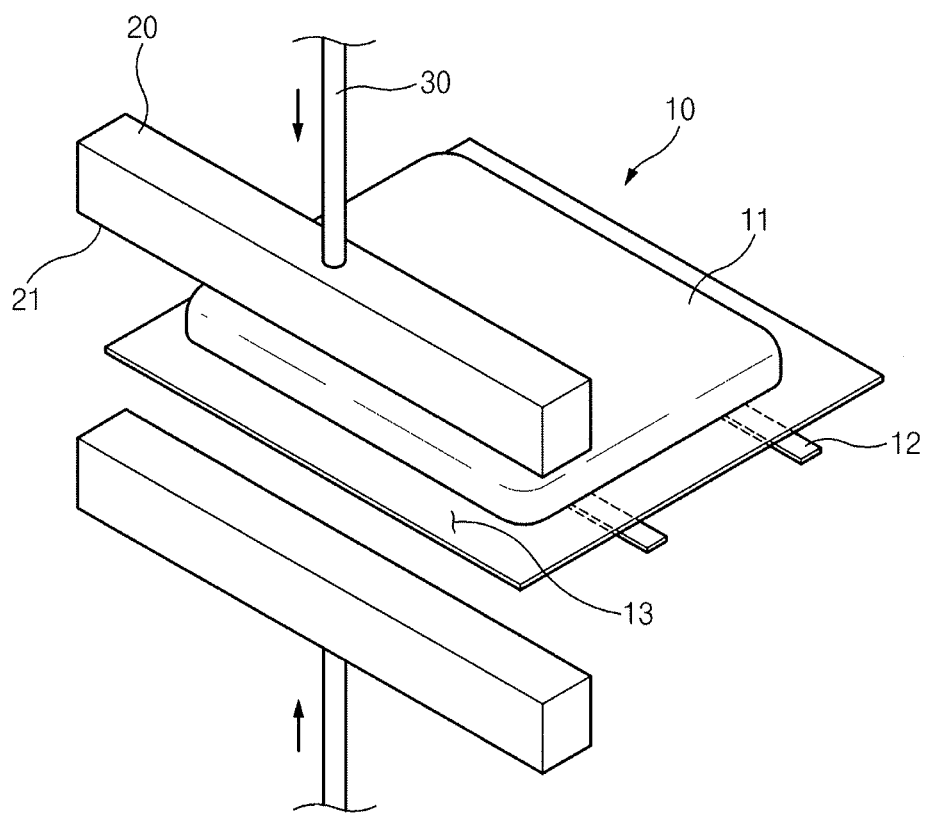
FIG. 1 is a perspective view of a pouch type secondary battery and a sealing tool for sealing the pouch type secondary battery according to a related art.

Referring to FIGS. 3 and 4, a sealing tool for a pouch type secondary battery includes a holder 100 elevatably disposed on each of upper and lower sides of a pouch (see reference numeral 11 of FIG. 1) of the pouch type secondary battery (see reference numeral 10 of FIG. 1), a sealing block 200 coupled to the holder 100 to contact the pouch 11 by the elevation of the holder 100, thereby sealing the pouch 11, wherein the sealing block 200 and the holder 100 are spaced apart from each other to define a space therebetween, and a spacing member 300 interposed in the space S between the holder 100 and the sealing block 200.

Here, since components of the sealing tool, which are respectively disposed on the upper and lower sides of the pouch 11, are the same except for their mounted positions and directions, for convenience of explanation, only the sealing tool disposed on the upper side of the pouch 11 will be described.

Firstly, the holder 100 may be provided as a metal plate having a predetermined thickness. Also, the holder 100 has both ends that are bent downward. That is, the holder 100 may have a "⊂"-shaped lower portion. Also, an elevation unit 110 is disposed on a central portion of a top surface of the holder 100 to elevate the holder 100. Here, the elevation unit 110 may be provided as a general cylinder that is widely used. However, the present invention is not limited thereto. For example, the elevation unit 110 may include every unit that is capable of elevating the holder 100.

Further, the sealing block 200 may be provided as a square bar-shaped metal member having a length corresponding to that of the sealing part 13 of the pouch 11. The sealing block 200 may be disposed on an opening that is defined in a lower end of the holder 100 to cover the opening of the holder 100. As described above, since the sealing block 200 is disposed on the opened lower end of the opening of the holder 100, a space S is defined between the holder 100 and the sealing block 200.

Figure 5:
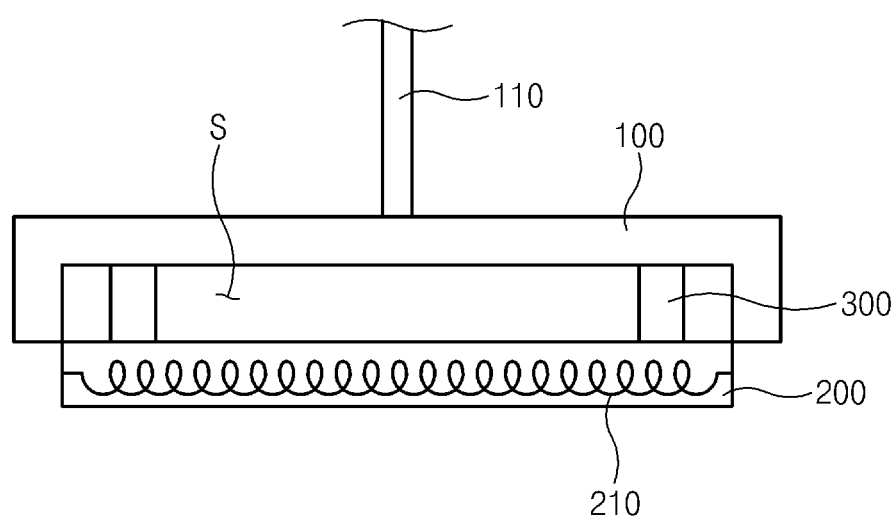
FIG. 5 is a side cross-sectional view of the sealing tool for the pouch type secondary battery according to the present invention.

Also, as illustrated in FIG. 5, a heating coil 210 is disposed in a whole region within the sealing block 200. The heating coil 210 receives electricity to generate heat by using electric resistance, thereby heating the sealing block 200. The heated sealing block 200 descends by an operation of the elevation unit 110 to allow a bottom surface of the sealing block 200 to press the sealing part 13 of the pouch 11. The sealing part 13 of the pouch 11 is heated and pressed by the sealing block 200 to allow the sealing part 13 to seal the pouch 11.

The spacing member 300 interposed in the space S between the holder 100 and the sealing block 200 may be provided as an approximately square box-shaped member having a height corresponding to that of each of both bent ends of the holder 100. Also, the spacing member 300 may be provided in a pair, and the pair of spacing members 300 may be respectively disposed on both ends of the space S. The spacing member 300 may maintain the space S and support an upper inner surface of the holder 100 to prevent the space S from being reduced in volume by an external force. Here, the spacing member 300 may be provided as an elastic body having elasticity in the elevation direction of the holder 100 or a feeler gauge. This is done for a reason in which the spacing member 300 that is provided as the elastic body acts as a buffer between the holder 100 and the sealing block 200 to realize more uniform sealing when the sealing part 13 of the pouch 11 is pressed. Also, the feeler gauge may measure a distance between two components. Thus, the spacing member 300 that is provided as the feeler gauge may measure a variation in height of the space S. Here, only one of the elastic body or the feeler gauge may function as the spacing member 300. Alternatively, the elastic body and the feeler gauge may be combined with each other to function as the spacing member 300. This may be realized by worker's random selection.

Hereinafter, an operation of the sealing tool according to the present invention will be described in detail with reference to FIGS. 6 and 7.

Figure 6:
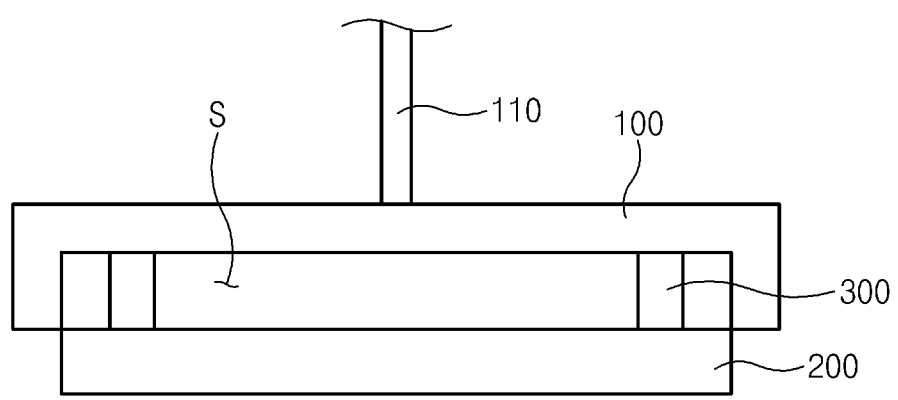
FIGS. 6 and 7 are views illustrating an operational state of the sealing tool for the pouch type secondary battery according to the present invention.
Figure 7:
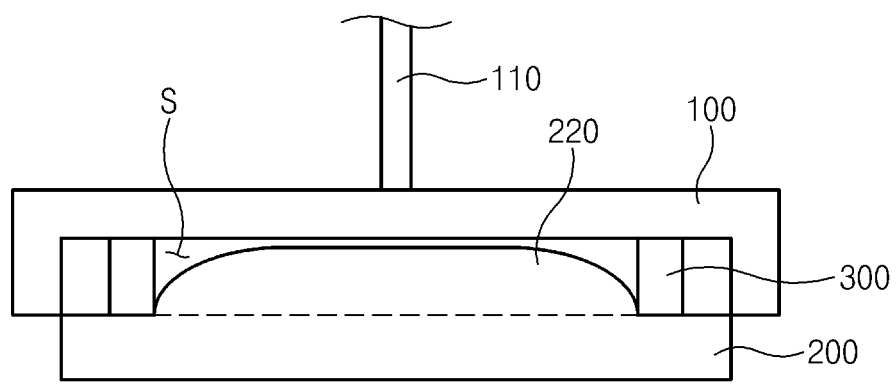

FIGS. 6 and 7 are views illustrating an operational state of the sealing tool for the pouch type secondary battery according to the present invention.

Figure 2:
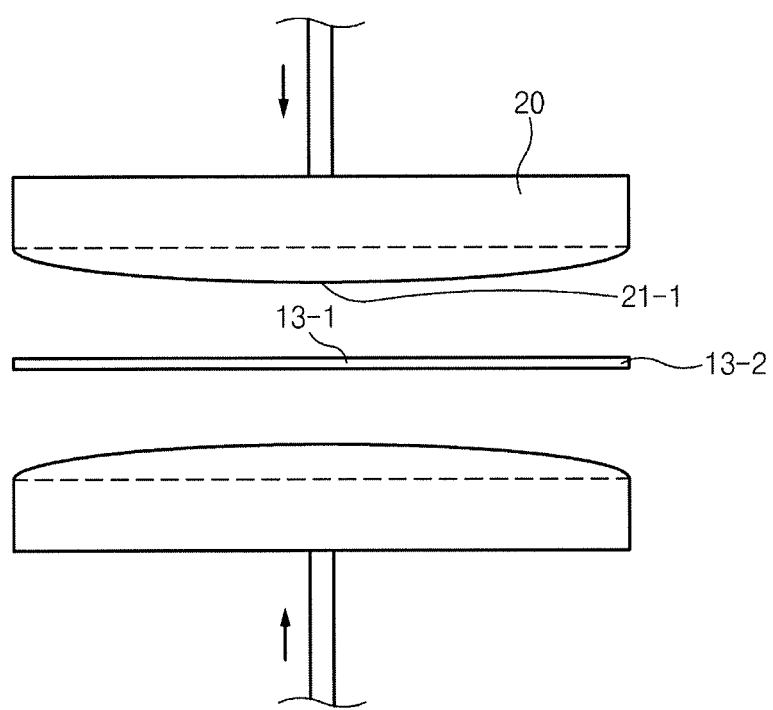
FIG. 2 is a side view of the pouch type secondary battery and the sealing tool for sealing the pouch type secondary battery according to the related art.

The sealing block 200 used under a high-temperature condition may be thermally deformed due to the long use time. According to the related art, as illustrated in FIG. 2, since the sealing tool 20 is provided as one member, if the thermal deformation occurs, the lower sealing surface 21 of the sealing tool 20 may be thermally deformed to stretch. As a result, it may be difficult to completely seal the pouch 11 through the sealing part 13.

However, according to the present invention, since the sealing tool is constituted by the holder 100 and the sealing block 200 that are separated from each other to define the space S between the holder 100 and the sealing block 200, the surface of the sealing block 220 may also be thermally deformed toward the space S to minimize the thermal deformation of the lower surface of the sealing block 200. Therefore, the pouch 11 may be uniformly sealed by the sealing part 13 to prevent the electrolyte from leaking.

The pouch 11 of the pouch type secondary battery may be uniformly sealed through the sealing part 13 by using the sealing tool. The pouch type secondary battery includes the pouch 11 provided with the electrolyte and the electrode assembly therein. Thus, the pouch 11 may be sealed by the sealing part 13 to prevent the electrolyte from leaking to the outside. Here, the electrode assembly may include one of a jelly-roll type electrode assembly in which at least one anode, separator, and cathode are successively stacked and wound, a stack and folding type electrode assembly in which a unit cell comprising an anode, a separator, and a cathode, which are successively stacked, is disposed on a separator having a long film shape and is wound in a single direction, and a stack and folding type electrode assembly in which a unit cell comprising an anode, a separator, and a cathode, which are successively stacked, is disposed on a separator having a long film shape and is wound in a zigzag direction. That is, the scope of the present invention is not limited by the electrode assembly provided in the pouch 11.

Heretofore, the exemplary embodiment with respect to the sealing tool for the pouch type secondary battery according to the present invention has been described as an example.

The above-described embodiments are in all respects as illustrative and non-limiting, it is to be understood that the scope of the present invention are described below, rather than the above description appears by the claims, and the scope of the present invention is defined by the appended claims rather than the foregoing description and the exemplary embodiments described therein. Various modifications made within the meaning of an equivalent of the claims of the invention and within the claims are to be regarded to be in the scope of the present invention.

What is claimed is:

1. A sealing tool for a pouch type secondary battery, which seals a pouch provided with an electrode assembly therein, the sealing tool comprising:
   a holder elevatably disposed on a side of the pouch; and
   a sealing block coupled to the holder to contact the pouch by the elevation of the holder, thereby sealing the pouch, the sealing block and the holder spaced apart from each other in a first direction to define a space therebetween;
   a first spacing member in the space between the sealing block and the holder; and
   a second spacing member in the space between the sealing block and holder, the second spacing member spaced apart from the first spacing member in a second direction,
   wherein the first spacing member and second spacing member extend between a top surface of the sealing block and a bottom surface of the holder.

2. The sealing tool of claim 1, wherein the spacing members are provided as an elastic body having elasticity in a direction in which the holder is elevated.

3. The sealing tool of claim 1, wherein the spacing members are provided as a feeler gauge.

4. The sealing tool of claim 1, wherein a void is created between the first spacing member, the second spacing member, the holder and the sealing block, and
   wherein the sealing block can expand into the void.

5. The sealing tool of claim 1, further comprising a heating coil built in the sealing block.

6. A sealing tool for a pouch type secondary battery, which seals a pouch provided with an electrode assembly therein, the sealing tool comprising:
   a holder elevatably disposed on a side of the pouch;
   a sealing block coupled to the holder to contact the pouch by the elevation of the holder, thereby sealing the pouch, the sealing block and the holder spaced apart from each other in a first direction, and
   a space between the sealing block and the holder,
   a first spacing member in the space between the sealing block and holder; and
   a second spacing member in the space between the sealing block and holder, the second spacing member spaced apart from the first spacing member in a second direction,
   wherein the first spacing member and second spacing member extend between a top surface of the sealing block and a bottom surface of the holder, and
   wherein the sealing block can expand into the space.

7. The sealing tool of claim 6, further comprising a heating coil in the sealing block.

8. A sealing tool for a pouch type secondary battery, which seals a pouch provided with an electrode assembly therein, the sealing tool comprising:
   a pair of sealing jaws, each sealing jaw comprising:
   a holder elevatably disposed on a side of the pouch; and
   a sealing block coupled to the holder to contact the pouch by the elevation of the holder, thereby sealing the pouch, the sealing block and the holder spaced apart from each other in a first direction to define a space therebetween;
   a first spacing member in the space between the sealing block and holder; and a second spacing member in the space between the sealing block and holder, the second spacing member spaced apart from the first spacing member in a second direction, wherein the first spacing member and second spacing member extend between a top surface of the sealing block and a bottom surface of the holder.

\* \* \* \* \*